(12) United States Patent
Jayachandran

(10) Patent No.: US 10,832,521 B2
(45) Date of Patent: *Nov. 10, 2020

(54) BLOCKCHAIN GAMING

(71) Applicant: International Business Machines Corporation, Armonk, NY (US)

(72) Inventor: Praveen Jayachandran, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/458,590

(22) Filed: Jul. 1, 2019

(65) Prior Publication Data

US 2019/0325700 A1   Oct. 24, 2019

Related U.S. Application Data

(63) Continuation of application No. 15/334,916, filed on Oct. 26, 2016, now Pat. No. 10,380,842.

(51) Int. Cl.
*G07F 17/32* (2006.01)
*H04L 9/32* (2006.01)

(52) U.S. Cl.
CPC ...... *G07F 17/3244* (2013.01); *G07F 17/3225* (2013.01); *G07F 17/3295* (2013.01); *H04L 9/3236* (2013.01); *H04L 9/3297* (2013.01); *H04L 2209/38* (2013.01)

(58) Field of Classification Search
CPC ............... G06Q 30/0261; G06Q 10/02; G06Q 10/06311; G06Q 10/10; G06Q 20/045; G06Q 20/0453; G06Q 20/0457; G06Q 20/18; G06Q 20/201; G06Q 20/32; G06Q 20/3825; G06Q 20/401; G06Q 30/02; G06Q 30/0205; G06Q 30/0222; G06Q 30/0235; G06Q 30/0258; G06Q 30/0259; G06Q 30/0263; G06Q 30/0264; G06Q 30/0601; G06Q 30/08; G06Q 40/04; G06Q 40/12; G06Q 50/01
See application file for complete search history.

(56) References Cited

U.S. PATENT DOCUMENTS

| | | | |
|---|---|---|---|
| 2007/0021213 | A1 | 1/2007 | Foe et al. |
| 2015/0245084 | A1 | 8/2015 | Downing et al. |
| 2016/0055236 | A1 | 2/2016 | Frank et al. |
| 2016/0092988 | A1 | 3/2016 | Letourneau |
| 2017/0084118 | A1 | 3/2017 | Robinson et al. |

OTHER PUBLICATIONS

List of IBM Patents or Patent Applications Treated as Related, Jul. 11, 2019.
P. Jayachandran et al., "Blockchain Gaming", U.S. Appl. No. 15/334,916, filed Oct. 26, 2016 (a copy is not provided as this application is available to the Examiner).

(Continued)

*Primary Examiner* — William H McCulloch, Jr.
*Assistant Examiner* — Ankit B Doshi

(57) ABSTRACT

Utilizing blockchain in a gaming environment comprises one or more of receiving one or more contracts related to a game stored in a blockchain, initiating a game session of the game based on the one or more contracts, and receiving information and actions related to a game player in the blockchain based on the initiated game session.

20 Claims, 6 Drawing Sheets

(56) References Cited

OTHER PUBLICATIONS

Back et al., "Enabling Blockchain Innovations with Pegged Sidechains," Paper, Oct. 22, 2014, https://people.xiph.org/-greg/sidechains.pdf.

Buechler et al, "Decentralized Reputation System for Transaction Networks," Project, Dept. of CIS, Senior Design 2014-2015, University of Pennsylvania.

Fisher, Decentralized Peer to Peer Game Assets Platform, Integration with Third Party Games using Smart Contract, Aug. 4, 2014, https:1/dacplay .org/pdf/BitSharesPlayWhitePaper _ EN .pdf.

Kraft, "Game Channels for Trustless Off-Chain Interactions in Decentralized Virtual Worlds," https:1/extra. :tomob.eu/gamechannels.pdf, Oct. 20, 2015.

Wagner, Andrew, "Gaming on the Blockchain: the Huntercoin Saga," Bitcoin News Service, NEWSBTC, Feb. 2, 2016, http://www.newsbtc.com/2016/02/02/blockchain-gaming-huntercoin/.

BLOCKCHAIN GAMING

TECHNICAL FIELD

This application generally relates to gaming, and more particularly to blockchain gaming.

BACKGROUND

In a blockchain configuration, information is typically related to financial transactions. As the popularity of the blockchain configuration continues to increase so does the desire to implement additional functions on the blockchain. One area where additional functions can be provided is gaming.

SUMMARY

One example embodiment may include a method that comprises one or more of retrieving a game stored in a blockchain, receiving one or more contracts to initiate a game session of the game, initiating the game session, and logging game player information and game player actions of one or more game players in the blockchain.

Another example embodiment may include a method that comprises one or more of utilizing blockchain in a gaming environment comprises one or more of receiving one or more contracts related to a game stored in a blockchain, initiating a game session of the game based on the one or more contracts, and receiving information and actions related to a game player in the blockchain based on the initiated game session.

A further example embodiment may include a non-transitory computer readable medium comprising instructions that, when read by a processor, permit the processor to perform one or more of receiving one or more contracts related to a game stored in a blockchain, initiating a game session of the game based on the one or more contracts, and receiving information and actions related to a game player in the blockchain based on the initiated game session.

Yet another example embodiment may include a system, comprising one or more of a processor and memory communicably coupled to the processor, wherein the processor is configured to perform one or more of a following step receive one or more contracts related to a game stored in a blockchain, initiate a game session of the game based on the one or more contracts, and receive information and actions related to a game player in the blockchain based on the initiated game session.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide an application and/or software procedure which provides games to user devices and third parties interested in accessing such games. For example, by storing games in the blockchain, the information associated with the games can be accessed, verified and provided to end users without additional resources from other game support groups or remote access components.

Figure 1:
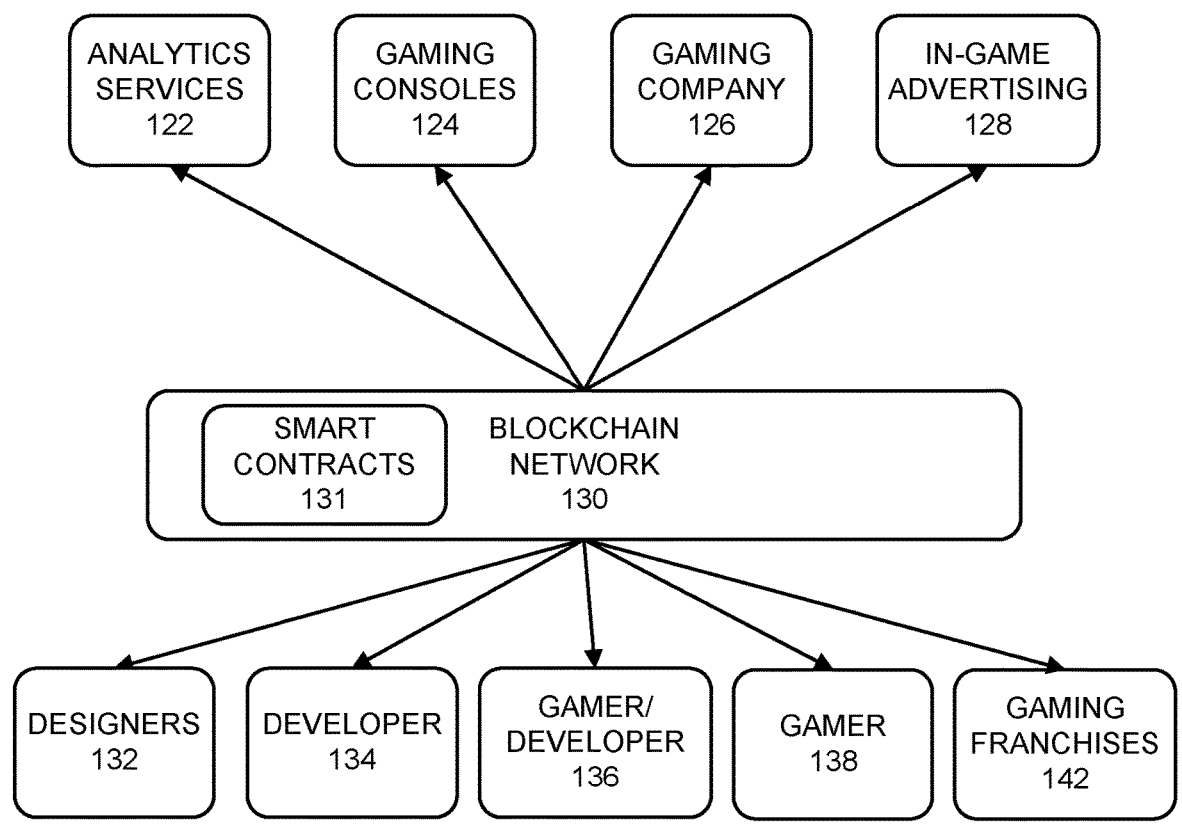
FIG. 1 illustrates a network diagram of a blockchain network diagram of gaming accessibility and development in the blockchain according to example embodiments.

FIG. 1 illustrates a network diagram of a blockchain network diagram of gaming accessibility and development in the blockchain according to example embodiments. Referring to FIG. 1, the games use a client-server model 100 by accessing the blockchain data, such as smart contracts 131 to access and utilize a game stored in the blockchain network 130. In this configuration, games which are peer-to-peer (P2P) will be fully supportive of each user's game session. For instance, no one user (i.e., super-user) is required to host the game session. Each user has their own game profile and may access a games session independently without a network of support to maintain a game session. The game session may be stored in the blockchain along with all entries submitted (i.e., updates, user moves, user profiles). All game data is logged and stored in the blockchain. The user device or game console device may also have memory for storing game related data. However, the blockchain will store all game information needed to conduct and retrieve a game, a gamer profile, and/or other game related information. The game's core logic code is stored on the blockchain which ensures fair gameplay similar to a central server providing game support to multiple users. Some game code can exist outside the blockchain, such as a graphics rendering, however, this is not a necessity. Every move, input, save operation, change in the environment of a game player is a transaction that invokes code on the blockchain to change state and be stored.

The parties to the blockchain game may include analytics services 122, a gaming console 124, a gaming company 126, an in-game advertising service 128, designers 132, developers 134, a gamer/developer 136, a gamer 138 and a gaming franchise 142. Any of those parties may be interested in any of accessing a game, saving game data, updating a game, loading a game, advertising with a game, accessing stored game data, etc. For example, developers can easily add features to the game without any down-time (e.g., challenges, maps, new levels, bonus options for player characters). Modifications (Mods) are also examples of gaming companies provide extensive support and documentation for developers to create mods in the blockchain which will create a fork for gamers to experiment with other options. Developers can post an idea, gather feedback, support, develop and release new updates to games. Game players can access a fork and if it gains popularity the fork can be a game of its own or the features provided by the fork can be included in the main game portion stored in the blockchain.

Game designers can provide game additions that can be purchased, such as special effects, artifacts, clothing in the virtual world, game status changes, game level updates, etc. Advertisers can place their products in the virtual world similar to in-film advertising or web based advertising with inserted media clips with ads. Additionally, every player's moves are logged on the ledger so the users can view the moves, actions and other logged data of the users who have won the game or have played the game. Game analytics may include monitoring and assessing players for games, such as basketball and football. Individual players can be assessed and their skills can be analyzed and aggregated as statistics. Various uses can determine user preferences by shadowing an expert player and referencing every player move submitted to learn new techniques.

Gaming companies can create a creative core of the game along with a preliminary implementation on the blockchain. Gaming consoles support multiple games and a platform for virtual asset trading. In operation, the game's logic executes as a contract. Players can enter into contracts to form teams that compete against each other. Franchises can sign-up players to form teams to compete in tournaments.

Figure 2:
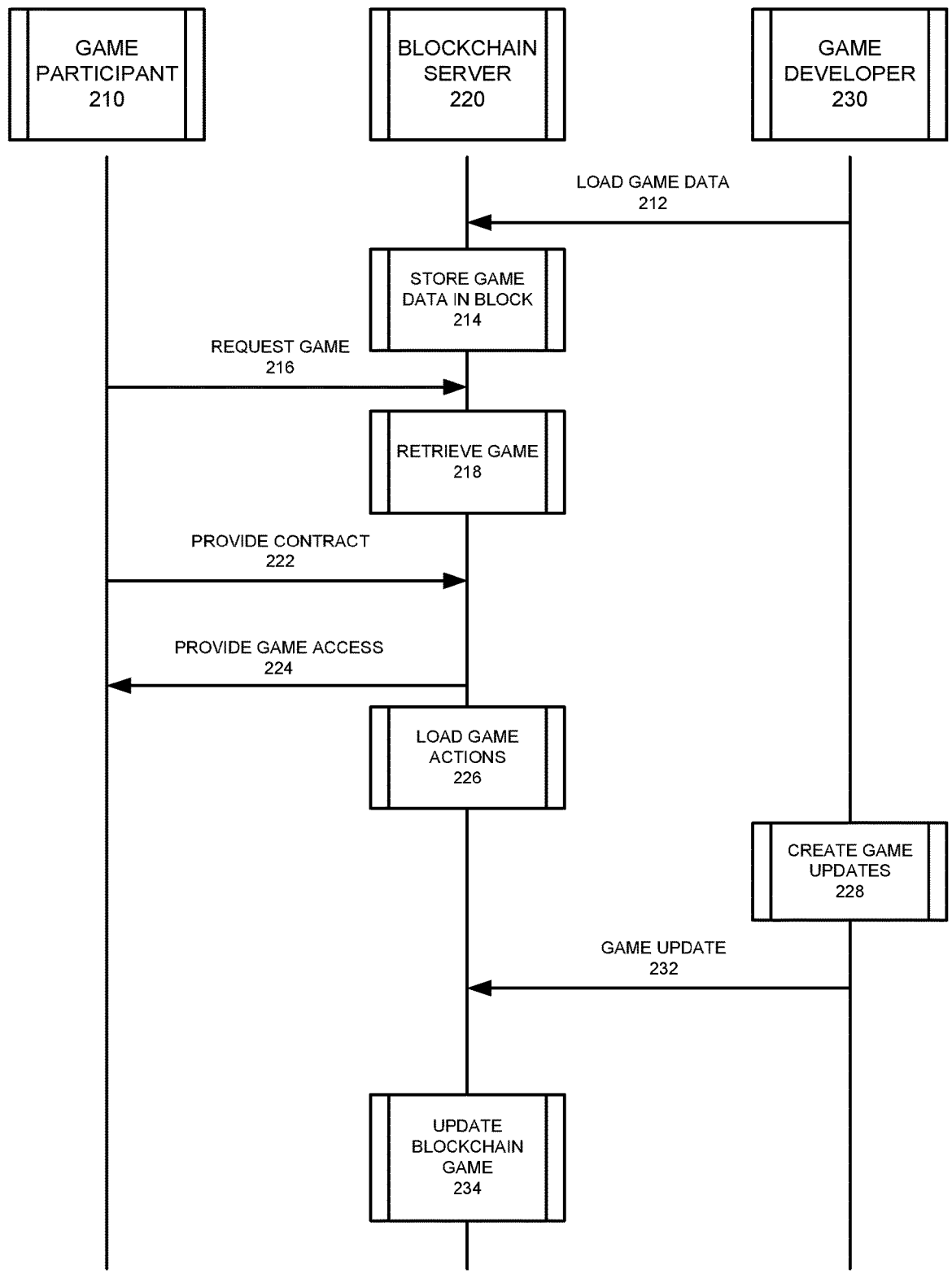
FIG. 2 illustrates a system signaling diagram of a blockchain gaming configuration according to example embodiments.

FIG. 2 illustrates a system signaling diagram of a blockchain gaming configuration according to example embodiments. Referring to FIG. 2, the system configuration 200 includes a game participant 210, a game developer 230 and a blockchain server 220 where the games are stored. In operation, the game developer 230 may load a game 212 on the blockchain. The game can be stored in block 214. A user may then request access to a game 216. The game can be retrieved 218 and a contract can be provided 222 to the blockchain related to the game session. The blockchain server can then offer a game session 224 to the game participant 220. All game related actions are logged 226. In another example, the game developer 230 may create game updates 228 and update the game 232. The blockchain data can be updated to reflect the game updates 234.

Figure 3A:
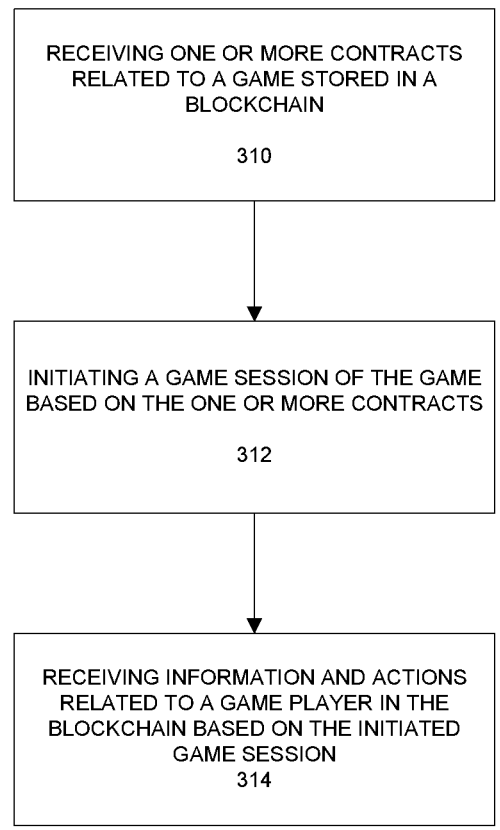
FIG. 3A illustrates a flow diagram of an example method of operation according to example embodiments.

FIG. 3A illustrates a flow diagram of an example method of operation according to example embodiments. Referring to FIG. 3A, the example method 300 includes one or more of receiving one or more contracts related to a game stored in a blockchain 310, initiating a game session of the game based on the one or more contracts 312, and receiving information and actions related to a game player in the blockchain based on the initiated game session 314.

The method may further comprise receiving content related to the game, creating a modified game based on the received content and storing the modified game in the blockchain, as well as performing one or more of permitting the modified game to be played separately from the game and permitting the modified game to be played with the game. The method can further comprise determining whether the modified game has reached a popularity level, responsive to determining the modified game has reached the popularity level, merging the modified game with the game to create an updated game, and storing the updated game in the blockchain as a contract.

The method can further comprise receiving content related to the game, creating a modified game based on the received content, and presenting the modified game to the game player without interrupting the game session, as well as analyzing the actions related to the game player, presenting a sequence in the game session based on the actions, and storing the actions and the sequence in the blockchain, wherein the actions related to the game player comprise one or more of an action performed during the game session, a skill level of the game player, a preference of the game player, a location of the game player, a personal information of the game player, a photo of the game player, and an image related to the game player.

Figure 3B:
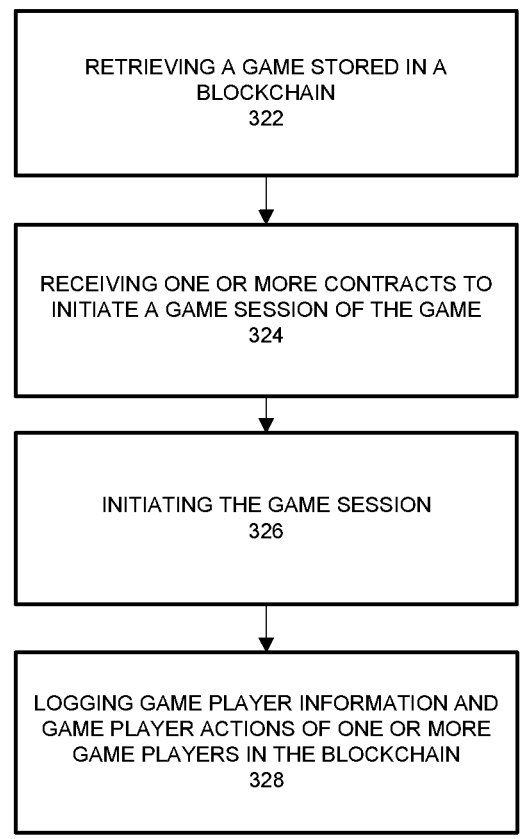
FIG. 3B illustrates a flow diagram of an example method of operation according to example embodiments.

FIG. 3B illustrates a flow diagram of an example method of operation according to example embodiments. Referring to FIG. 3B, the example method 320 includes one or more of retrieving a game stored in a blockchain 322, receiving one or more contracts to initiate a game session of the game 324, initiating the game session 326, and logging game player information and game player actions of one or more game players in the blockchain 328. In another example, the method may include receiving the game player actions, creating game player analytics based on the game player actions received during the game session, and storing the game player analytics in the blockchain. The game player analytics may include one or more of a series of actions submitted to the game during the game session, skill level of the one or more game players, and preferences of the one or more game players. The method may also include receiving a game update, performing the game update in the blockchain, and storing the updated game in the blockchain as a contract. The game update is received and processed without interrupting the game session. The method may also include storing game items for purchase in the blockchain, retrieving the game items responsive to initiating the game, and displaying the game items on the game player devices during the game session. Additionally, the method may provide receiving new game content and creating a modified game based on the new game, content and content of the game, storing the modified game in a separate portion of the blockchain than a portion of the blockchain storing the game, permitting the modified game to be played separately from the game, determining whether the modified game has reached a threshold popularity level, and responsive to determining the modified game has reached the threshold popularity level, merging the modified game with the game.

The blockchain may be used to access a MOD "fork." Game developers may expose the code and a set of APIs that permit other developers to modify the game in various ways and create "MODs" or "MOD games." For a blockchain game, a developer can create a fork of the blockchain and support smart contracts that capture the MOD game. The smart contracts will capture the differences/MODS from the original game. Game participants can select to play the original game or the MOD game and provide feedback to the developers. This permits gamers to reuse their accrued 'status' in the main game and the MOD game as well.

A game developer may create a contract that captures the logic and the state needed to be maintained for the game. Gamers can maintain the blockchain network and thus no central host/server is needed. Further, a gamer may maintain their blockchain node with a cloud provider. Every action a user can take in the game may be provided as a smart contract function. When a game participant performs a particular game action, the corresponding smart contract function is invoked, and the change in the game's state is recorded as a transaction on the blockchain. Other participants/game players can also have their actions recorded, such as in a multi-player or turn-based game. The blockchain records the sequence of such actions from all gamers, maintaining an immutable record of all game actions across all participants. The contracts may be ongoing and non-terminating, as a core logic of the game is continuously received and updated as well as the game's state across all participants. A game can be thought of as one or more contracts. Furthermore, additional complementary capabilities, such as analytics or advertising are also created as contracts that run on the blockchain.

The contract can also include access control rules pertaining to the game. The part of a gamer player's state that the game permits others to access may be exposed during game play. In one example, "shadowing" of an expert player may include every game move made by an 'expert' game player being logged along with the scenario in which the expert performed that action. In this example, an expert's play and other related actions can be made available to a non-expert player.

Since the blockchain is a peer-to-peer configuration, there is no central game server that participants are required to connect with or that is needed to maintain the state of the game or game session. The state is maintained in a decentralized fashion on the blockchain and no individual participant or player can change the past history or manipulate the game to their advantage. Any action a participant performs is broadcast to all other participants, and the participants may agree that the action/game move is a valid move and should be recorded. Apart from the fact that the smart contracts on the blockchain manage and maintain the actions of participants in the game, there would not be any change in the actual state a game would maintain.

Figure 3C:
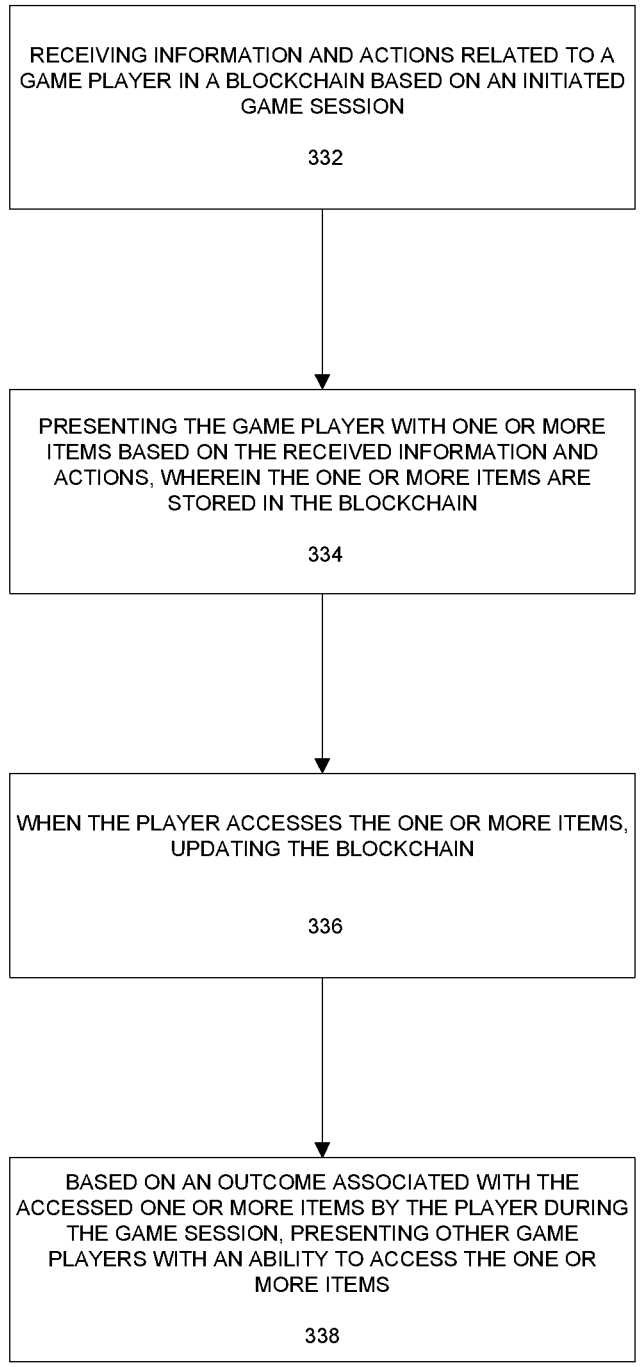
FIG. 3C illustrates a flow diagram of an example method of operation according to example embodiments.

FIG. 3C illustrates a flow diagram of an example method of operation according to example embodiments. Referring to FIG. 3C, the example method 330 includes one or more of receiving information and actions related to a game player in a blockchain based on an initiated game session 332, presenting the game player with one or more items based on the received information and actions, wherein the one or more items are stored in the blockchain 334, when the player accesses the one or more items, updating the blockchain 336, and based on an outcome associated with the accessed one or more items by the player during the game session, presenting other game players with an ability to access the one or more items 338.

For example, a system can receive information and actions related to a game player in a blockchain based on an initiated game session. The game player may be maneuvering through a single-player or multiplayer game session and based on a number of factors, such as the game player's previous session(s), the game player's skill level, the game player's location, etc., the game player can be presented with one or more items based on the received information and actions. The items, which are stored in the blockchain, can include any object that would potentially aide the player and enhance the game session. When the player accesses the one or more items, the system updates the blockchain and monitors the action(s) of the player during the game session. Based on an outcome associated with the accessed one or more items by the player during the game session, presenting other game players with an ability to access the one or more items. For example, a certain player may be performing an action that results in a degradation of the game session for the player. Based on this degradation, which could relate to the certain player taking actions counter to the spirit or intent of the game, the system can present the one or more items to permit the player to overcome this degradation. If the degradation is overcome (i.e. the outcome is met), other players can be presented with an ability to access the one or more items to allow a more optimal gaming session.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
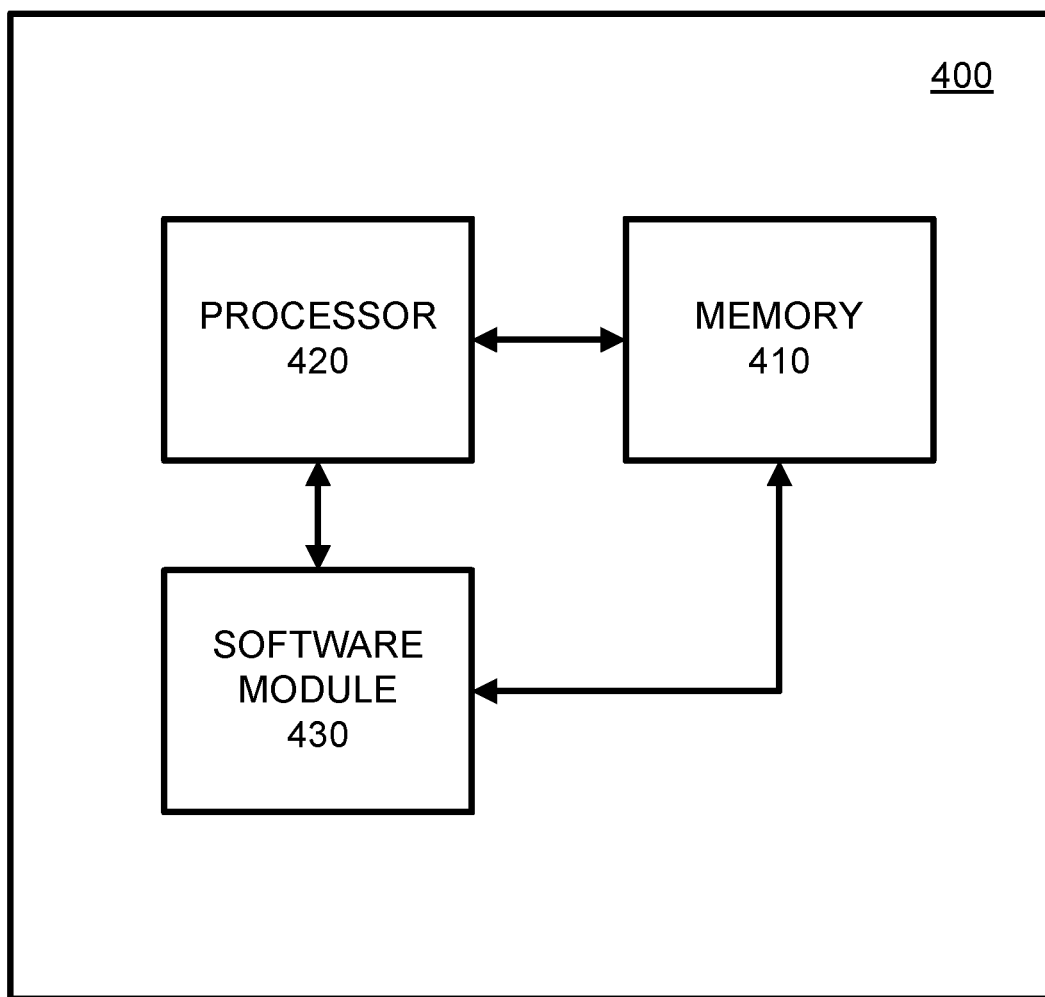
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving, via a blockchain, one or more contracts containing logic and state information related to a decentralized game stored in a first block of the blockchain;
   initiating, via the blockchain, a game session of the decentralized game based on the one or more contracts;
   receiving a contract containing information and actions, related to a game player, based on the initiated game session;
   invoking one or more functions included in the one or more contracts to change a state of the decentralized game;
   receiving a new contract implementing new game content;
   creating a modified decentralized game based on the new game content; and
   storing the modified decentralized game as a contract in a second block of the blockchain different than the first block of the blockchain so as to permit the modified decentralized game to be played without playing the decentralized game.

2. The method of claim 1, wherein the actions are received from a game player device associated with the game player and permitting the modified decentralized game to be accessed by the game player device during the game session of the decentralized game.

3. The method of claim 1, comprising permitting the modified decentralized game to be played with the game.

4. The method of claim 1, comprising:
   determining whether the modified decentralized game has reached a popularity level;
   responsive to determining the modified decentralized game has reached the popularity level, merging the modified decentralized game with the decentralized game to create an updated decentralized game; and
   storing the updated decentralized game in the blockchain as a contract.

5. The method of claim 1, comprising:
   presenting the modified decentralized game to the game player without interrupting the game session.

6. The method of claim 1, comprising:
   analyzing the actions related to the game player;
   presenting a sequence in the game session based on the actions; and
   storing the sequence in the blockchain.

7. The method of claim 1, wherein the actions related to the game player comprise one or more of:

an action performed during the game session;
a skill level of the game player;
a preference of the game player;
a location of the game player;
a personal information of the game player;
a photo of the game player; and
an image related to the game player.

8. A non-transitory computer readable medium storing one or more instructions that when executed by a processor cause the processor to perform:
   receiving, via a blockchain, one or more contracts containing logic and state information related to a decentralized game stored in a first block of the blockchain;
   initiating, via the blockchain, a game session of the decentralized game based on the one or more contracts;
   receiving a contract containing information and actions, related to a game player, based on the initiated game session;
   invoking one or more functions included in the one or more contracts to change a state of the decentralized game;
   receiving a new contract implementing new game content;
   creating a modified decentralized game based on the new game content; and
   storing the modified decentralized game as a contract in a second block of the blockchain different than the first block of the blockchain so as to permit the modified decentralized game to be played without playing the decentralized game.

9. The non-transitory computer readable medium of claim 8, wherein the actions are received from a game player device associated with the game player and further storing one or more instructions that when executed by the processor cause the processor to perform permitting the modified decentralized game to be accessed by the game player device during the game session of the decentralized game.

10. The non-transitory computer readable medium of claim 8, further storing one or more instructions that when executed by the processor cause the processor to perform permitting the modified decentralized game to be played with the game.

11. The non-transitory computer readable medium of claim 8, further storing one or more instructions that when executed by the processor cause the processor to perform:
   determining whether the modified decentralized game has reached a popularity level;
   responsive to determining the modified decentralized game has reached the popularity level, merging the modified decentralized game with the decentralized game to create an updated decentralized game; and
   storing the updated decentralized game in the blockchain as a contract.

12. The non-transitory computer readable medium of claim 8, further storing one or more instructions that when executed by the processor cause the processor to perform:
   presenting the modified game to the decentralized game player without interrupting the game session.

13. The non-transitory computer readable medium of claim 8, further storing one or more instructions that when executed by the processor cause the processor to perform:
   analyzing the actions related to the game player;
   presenting a sequence in the game session based on the actions; and
   storing the sequence in the blockchain.

14. The non-transitory computer readable medium of claim 8, wherein the actions related to the game player comprise one or more of:
   an action performed during the game session;
   a skill level of the game player;
   a preference of the game player;
   a location of the game player;
   a personal information of the game player;
   a photo of the game player; and
   an image related to the game player.

15. A system, comprising:
   a processor; and
   memory communicably coupled to the processor, wherein the processor is configured to:
   receive, via a blockchain, one or more contracts containing logic and state information related to a decentralized game stored in a first block of the blockchain;
   initiate, via the blockchain, a game session of the decentralized game based on the one or more contracts;
   receive a contract containing information and actions, related to a game player, based on the initiated game session;
   invoke one or more functions included in the one or more contracts to change a state of the decentralized game;
   receive a new contract that implements new game content;
   create a modified decentralized game based on the new game content; and
   store the modified decentralized game as a contract in a second block of the blockchain different than the first block of the blockchain so as to permit the modified decentralized game to be played without the decentralized game being played.

16. The method of claim 15, wherein the actions are received from a game player device associated with the game player and wherein the processor is configured to permit the modified decentralized game to be accessed by the game player device during the game session of the decentralized game.

17. The method of claim 15, wherein the processor is configured to permit the modified decentralized game to be played with the game.

18. The system of claim 15, wherein the processor is configured to:
   determine whether the modified decentralized game has reached a popularity level;
   responsive to a determination that the modified decentralized game has reached the popularity level, merge the modified decentralized game with the game to create an updated decentralized game; and
   store the updated game in the blockchain as a contract.

19. The system of claim 15, wherein the processor is configured to:
   present the modified decentralized game to the game player without an interruption of the game session.

20. The system of claim 15, wherein the processor is configured to:
   analyze the actions related to the game player;
   present a sequence in the game session based on the actions; and
   store the sequence in the blockchain.

* * * * *